United States Patent
Jåfs (10) Patent No.: US 11,585,362 B2
(45) Date of Patent: Feb. 21, 2023

(54) CONNECTING ELEMENT, A MECHANICAL JOINT AND USE OF TWO CONNECTING ELEMENTS IN A MECHANICAL JOINT

(71) Applicant: Harry Jåfs, Espoo (FI)

(72) Inventor: Harry Jåfs, Espoo (FI)

( * ) Notice: Subject to any disclaimer, the term of this patent is extended or adjusted under 35 U.S.C. 154(b) by 258 days.

(21) Appl. No.: 16/771,276

(22) PCT Filed: Dec. 13, 2018

(86) PCT No.: PCT/FI2018/050914
§ 371 (c)(1),
(2) Date: Jun. 10, 2020

(87) PCT Pub. No.: WO2019/115880
PCT Pub. Date: Jun. 20, 2019

(65) Prior Publication Data
US 2020/0400177 A1     Dec. 24, 2020

(30) Foreign Application Priority Data

Dec. 15, 2017    (FI) ...................................... 20176125

(51) Int. Cl.
*F16B 12/32*     (2006.01)
*F16B 12/20*     (2006.01)

(52) U.S. Cl.
CPC .............. *F16B 12/32* (2013.01); *F16B 12/20* (2013.01)

(58) Field of Classification Search
CPC .... F16B 5/0012; F16B 5/0016; F16B 5/0036; F16B 5/06; F16B 5/0621; F16B 5/0664;
(Continued)

(56) References Cited

U.S. PATENT DOCUMENTS 1,823,039 A * 9/1931 Jayk ........................ E04F 15/04
52/592.4
4,565,465 A     1/1986 Oberst
(Continued)

FOREIGN PATENT DOCUMENTS

CN     2503251 Y     7/2002
CN     1643226 A     7/2005
(Continued)

OTHER PUBLICATIONS

International Search Report issued by the Finnish Patent and Registration Office acting as the International Searching Authority in relation to International Application No. PCT/FI2018/050914 dated Apr. 10, 2019 (4 pages).
(Continued)

*Primary Examiner* — Josh Skroupa
(74) *Attorney, Agent, or Firm* — Robert P. Michal, Esq.; Carter, DeLuca & Farrell LLP (57) ABSTRACT

A connecting element for a mechanical joint includes a base part, and a connector part protruding from the base part. The connector part includes a protrusion portion, and a contacting portion extending from the protrusion portion to a direction of the first end of the base part such that a gap is formed between the contacting portion and the front surface of the base part and such that a bottom of the gap is formed by the protrusion portion. The contacting portion includes a front surface which is parallel to the portion of the front surface of the base part in the area of the gap and a back surface facing toward the front surface of the base part.

11 Claims, 7 Drawing Sheets

(58) Field of Classification Search
CPC .. F16B 5/07; F16B 12/20; F16B 12/32; F16B 12/44; F16B 12/46; F16B 12/50; F16B 12/54; F16B 2012/463; Y10T 403/65; Y10T 403/655; Y10T 403/70; Y10T 403/7043; Y10T 403/7045; Y10T 403/7094
USPC .................................. 403/DIG. 11, DIG. 13
See application file for complete search history.

(56) References Cited

U.S. PATENT DOCUMENTS

| | | | |
|---|---|---|---|
| 5,097,643 | A | 3/1992 | Richardson et al. |
| 5,651,221 | A * | 7/1997 | Golen ............... E06B 9/02 52/630 |
| 6,113,201 | A * | 9/2000 | Bauer ............... A47B 95/008 312/246 |
| 6,113,205 | A * | 9/2000 | Kuo ............... F16B 12/125 312/334.7 |
| 6,363,678 | B1 * | 4/2002 | Shuler ............... F16B 7/0426 403/340 |
| 8,434,955 | B2 * | 5/2013 | Rauschert ............... A45D 40/24 401/17 |
| 10,422,131 | B2 * | 9/2019 | Imbeau ............... E04B 2/847 |
| 11,280,085 | B2 * | 3/2022 | Buffington ............... E04C 2/20 |
| 2005/0006991 | A1 | 1/2005 | Saravis |
| 2008/0241440 | A1 * | 10/2008 | Bauer ............... E04F 15/02 428/33 |

FOREIGN PATENT DOCUMENTS

| | | | |
|---|---|---|---|
| DE | 1291947 B * | 4/1969 | ............... F16B 12/20 |
| DE | 8704984 U1 | 5/1987 | |
| DE | 4104823 A1 | 8/1992 | |
| DE | 43 13 895 A1 | 11/1994 | |
| DE | 202009016304 U1 | 4/2010 | |
| DE | 202013100718 U1 | 3/2013 | |
| DE | 102012105219 A1 | 6/2013 | |
| EP | 2581509 A2 | 4/2013 | |
| GB | 2093085 A | 8/1982 | |
| GB | 2495548 A | 4/2013 | |
| JP | S38000285 B | 1/1963 | |
| JP | 2005054960 A | 3/2005 | |
| JP | 2014181720 A | 9/2014 | |
| KR | 20100102777 A | 9/2010 | |
| KR | 101223458 B1 | 1/2013 | |

OTHER PUBLICATIONS

Written Opinion of the International Searching Authority issued by the Finnish Patent and Registration Office acting as the International Searching Authority in relation to International Application No. PCT/FI2018/050914 dated Apr. 10, 2019 (5 pages).
Finnish Search Report issued by the Finnish Patent and Registration Office in relation to Finnish Application No. 20176125 dated Jun. 28, 2018 (2 pages).
Supplemental European Search Report for Application No. 18887874.8 dated Feb. 18, 2021.
Chinese Search Report for application No. 2018800807055 dated Mar. 26, 2021 with English translation.
Chinese Search Report for Application No. 2018800807055 dated Jan. 6, 2022 with English translation.
Japanese Office Action for Application No. 2020552149 dated Jan. 17, 2022 with English translation.

* cited by examiner

Fig.7a  Fig.7b

CONNECTING ELEMENT, A MECHANICAL JOINT AND USE OF TWO CONNECTING ELEMENTS IN A MECHANICAL JOINT

CROSS-REFERENCE TO RELATED APPLICATIONS

This application is a national phase entry under 35 U.S.C. 371 of PCT International Application No, PCT/FI2018/050914 filed Dec. 13, 2018, which claims priority to Finnish Patent Application No. 20176125, filed Dec. 15, 2017, the disclosure of each of these applications is expressly incorporated herein by reference in their entirety.

FIELD OF THE INVENTION

The present invention relates to a connecting element.

The present invention further relates to a mechanical joint.

The present invention further relates to use of two connecting elements in a mechanical joint.

BACKGROUND OF THE INVENTION

Many kinds of mechanical joints are known in the prior art. Most of the known mechanical joints require either using tools for making the mechanical joint or the mechanical joint is such that it locks the joints by wedging the members forming the mechanical joint so that uncoupling the mechanical joint is impossible or if possible then not without breaking the mechanical joint so that it cannot be formed again using the same members.

BRIEF DESCRIPTION OF THE INVENTION

An object of the present invention is to provide a connecting element for a mechanical joint and a mechanical joint for connecting two parts mechanically together.

The objects of the invention are achieved by a connecting element and a mechanical joint which are characterized by what is stated in the independent claims. The preferred embodiments of the invention are disclosed in the dependent claims.

The invention is based on the idea of providing a connecting element for a mechanical joint which comprises a base part having a first end and a second end and a front surface extending between the first end and the second end, and a connector part protruding from the base part. The connector part comprising a protrusion portion arranged to protrude from the front surface of the base part, and a contacting portion extending from the protrusion portion to a direction of the first end of the base part such that a gap is formed between the contacting portion and the front surface of the base part and such that a bottom of the gap is formed by the protrusion portion. The contacting portion having a front surface which is parallel to the portion of the front surface of the base part in the area of the gap and a back surface facing toward the front surface of the base part. The contacting portion further having an end surface between the front surface and the back surface and extending from the front surface to the back surface.

The invention is further based on the idea of providing a mechanical joint for connecting two parts mechanically together. The mechanical joint comprises a first connecting element and a second connecting element, each connecting element comprises a base part having a first end and a second end and a front surface extending between the first end and the second end, and a connector part protruding from the base part. The connector part comprising a protrusion portion arranged to protrude from the front surface of the base part, and a contacting portion extending from the protrusion portion to a direction of the first end of the base part such that a gap is formed between the contacting portion and the front surface of the base part and such that a bottom of the gap is formed by the protrusion portion. The contacting portion having a front surface which is parallel to the portion of the front surface of the base part in the area of the gap and a back surface facing toward the front surface of the base part. The contacting portion further having an end surface between the front surface and the back surface and extending from the front surface to the back surface. The contacting portion of the first connecting element is arranged to be placed into the gap of the second connecting element and the contacting portion of the second connecting element is arranged to be placed into the gap of the first connecting element for forming the mechanical joint such that the front surface of the contacting portion of the first connecting element is arranged to be placed against the front surface of the base part of the second connecting element and the back surface of the contacting portion of the first connecting element is arranged to be placed against the back surface of the contacting portion of the second connecting element.

The connecting element and the mechanical joint disclosed in this application are most advantageously suitable for furniture industry when joining together parts of furniture such as a table leg and a table cover, a bed leg and a bed frame as an example. In other words, the connecting element and the mechanical joint are advantageous when connecting pieces of furniture, shelves, storage shelves, scaffolds or frames together as an example. The connecting element is suitable for joining together permanently or releasably two or more parts, such as the aforementioned examples of parts. The mechanical joint is suitable for making a permanent joint which is not intended to be dismantled or most suitable for a releasable joint that is intended to be unconnected and further reconnected.

An advantage of the invention is that in order to form a mechanical joint only one kind of connecting element is needed. In other words, to form a mechanical joint according to the invention only two similar connecting elements are needed to form the mechanical connection. The mechanical joint is formed without using any tools. The mechanical joint is such that it can be formed without wedging the connection elements together so that when the mechanical joint is opened the connecting elements can be reused again for forming another mechanical joint. Manufacturing the connecting elements forming the mechanical joint is simple because only one type of connecting elements are needed.

BRIEF DESCRIPTION OF THE DRAWINGS

The invention is described in detail by means of specific embodiments with reference to the enclosed drawings, in which.

DETAILED DESCRIPTION OF THE INVENTION

Figure 1A:
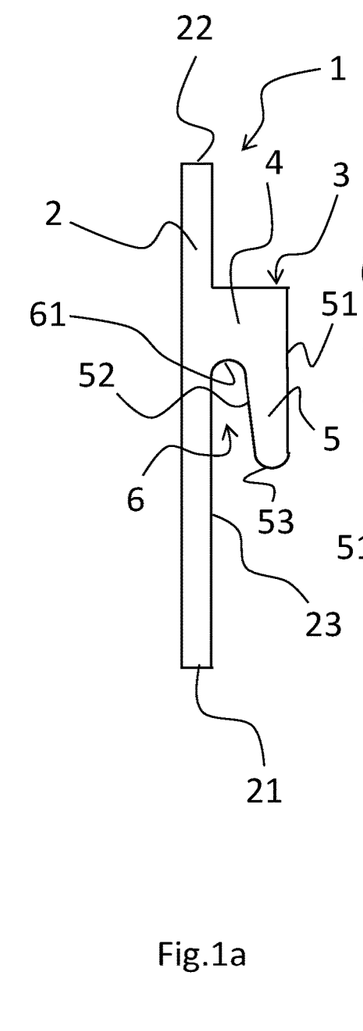
FIG. 1a shows a connecting element according to the invention from one side.
Figure 1B:
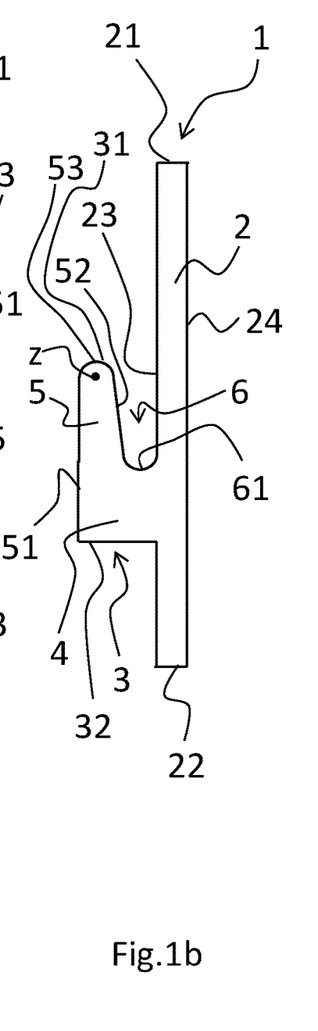
FIG. 1b shows the connecting element shown in FIG. 1a in a different position.

FIGS. 1a and 1b show a connecting element 1 according to the invention. FIGS. 1a and 1b show the same connecting element 1 as seen from the same side of the connecting element but in different positions. The connecting element 1 comprises a base part 2 having a first end 21 and a second end 22 and a front surface 23 extending between the first end 21 and the second end 22. The base part 2 is a longitudinal part having a length extending between the first end 21 and the second end 22 and a width extending transversely to a longitudinal direction of the base part 2. The base part 2 has a back surface 24 extending between the first end 21 and the second end 22 opposite to the front surface 23 and a first and second side surface 25, 26 extending between the front surface 23 and the back surface 24 between the first end 21 and the second end 22. The base part 2 has a thickness defined by a distance between the front surface 23 and the back surface 24.

The connecting element further comprises a connector part 3 protruding from the base part 2, the connector part 3 comprising a protrusion portion 4 arranged to protrude from the front surface 23 of the base part 2, and a contacting portion 5 extending from the protrusion portion 4 to a direction of the first end 21 of the base part 2 such that a gap 6 is formed between the contacting portion 5 and the front surface 23 of the base part 2 and such that a bottom 61 of the gap 6 is formed by the protrusion portion 4. The protrusion portion 4 and the contacting portion 5 are integral such that they form an integral connector part 3.

The contacting portion 5 has a front surface 51 which is parallel to the portion of the front surface 23 of the base part 2 in the area of the gap 6 and a back surface 52 facing toward the front surface 23 of the base part 2. The contacting portion 5 further has an end surface 53 between the front surface 51 and the back surface 52 and extending from the front surface 51 to the back surface 52.

Figure 1C:
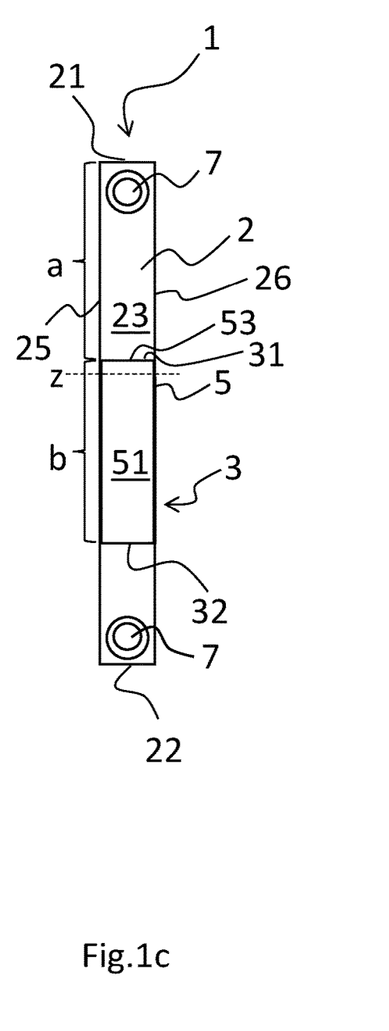
FIG. 1c shows the connecting element shown in FIG. 1b as seen from the front side.

FIG. 1c shows the connecting element as seen from the front. The connector part 3 has a distal end 31 and a proximal end 32, the distal end 31 is towards the first end 21 of the base part 2 and the proximal end 32 is towards the second end 22 of the base part 2. The end surface 53 of the contacting portion 5 forms the distal end 31 of the connector part 3. In this embodiment of the invention the front surface 51 of the contacting portion 5 extends from the distal end 31 of the connector part 3 to the proximal end 32 of the connector part 3. In other embodiments of the invention the protrusion portion 4 may have a different form such that the front surface 51 may not extend to the proximal end 32 of the connector part 3. The connector part 3 has a length b extending between the proximal end 32 and the distal end 31. The connecting element 1 has a free portion between the distal end 31 of the connector part 3 and the first end 21 of the base part 2. The free portion is in other word the part of the connecting element 1 which is between the first end 21 of the base part 2 and the distal end 31 of the connector part 3. The free portion has a length a which is greater than the length b of the connector part 3 between the proximal end 32 and the distal end 31.

The connecting element 1 preferably further comprises openings 7 at the ends of the base part 2 for connecting the connecting element 1 to an object.

A distance between the back surface 52 of the contacting portion 5 and the front surface 23 of the base part 2 is arranged to remain the same or decreasing towards the bottom 61 of the gap 6. In other words, the gap 6 is uniform or tapering towards the bottom 61 of the gap 6, meaning that the width of the gap 6 in a direction transverse to the longitudinal direction of the base part 2 and in a direction transverse to the front surface 51 of the contacting portion 5, i.e. width defined by the distance between back surface 52 of the contacting portion 5 and the front surface 23 of the base part 2, is equal or decreasing so that the gap 6 remains the same or tapers towards the bottom 61.

The end surface 53 of the contacting portion 5 has a first form and the bottom 61 of the gap 6 has a second form which is a compatible counter form for the first form. FIGS. 1b and 1c show a preferred embodiment of the invention showing an axis z which is a curvature axis for the end surface 53 of the contacting portion 5. The end surface 53 of the contacting portion 5 is convex having a curvature axis z which is parallel to the front surface 51 of the contacting portion 5 and transverse to a direction of the base part 2 between the first end and the second end, and the bottom 61 of the gap 6 has a compatible counter form having the same radius of curvature. The convex from at the end surface 53 of the contacting portion 5 is a curved or rounded outward surface as shown in the figures. The end surface 53 of the contacting portion 5 may have an alternative form other than the convex form but the convex form is most advantageous form for the mechanical joint 10 according to the invention. The end surface 53 of the contacting portion 5 may be for example a flat surface or a tapered surface.

In a preferred embodiment of the invention the part of the contacting portion 5 extending between the bottom 61 of the gap 6 formed by the protrusion portion 4 and the end surface 53 of the contacting portion 5 extending has a compatible counter form as the gap 6 formed between the back surface 52 of the contacting portion 5 and the front surface 23 of the base part 2 in the area facing the back surface 52 of the contacting portion 5. In other words, the gap 6 has the same form as the part of the contacting portion 5 that is to be provided in the gap 6 of a similar connecting element. In still other words, when there are two connecting elements joining together then the contacting portion 5 of a first connecting element that is provided in the gap 6 of a second connecting element is tightly fitted in the gap 6 which means that the contacting portion and the gap has similar forms that are compatible with each other.

Figure 2A:
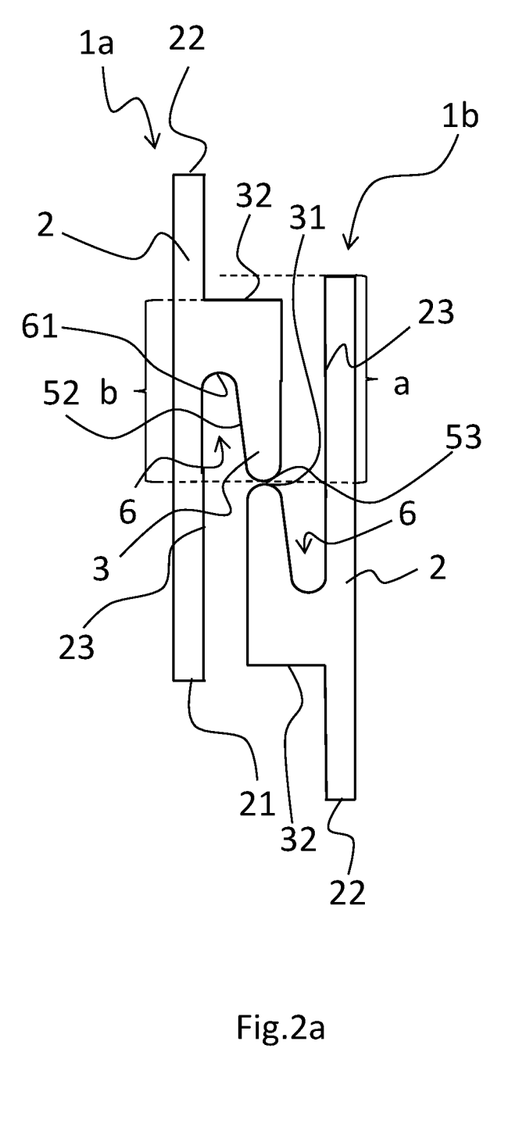
FIG. 2a shows two connecting elements according to the invention.
Figure 2B:
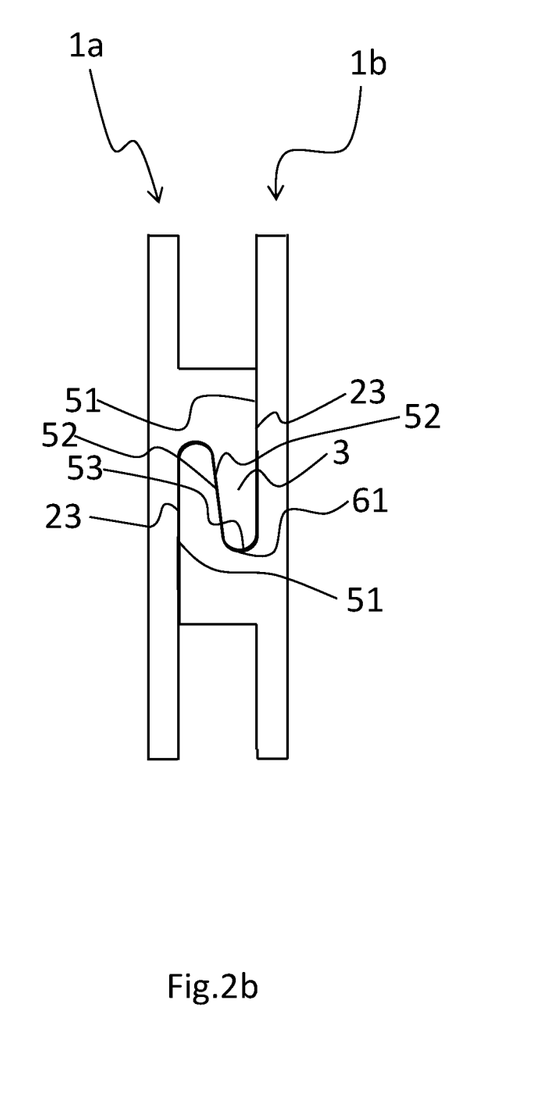
FIG. 2b shows a mechanical joint according to the invention.

FIG. 2a shows two connecting elements according to the invention in which the connecting elements 1 are similar as shown in FIGS. 1a-1c and therefore for the sake of clarity all the reference numbers that are shown in connection with FIGS. 1a-1c are not shown in FIGS. 2a and 2b. FIG. 2a shows a first connecting element 1a and a second connecting element 1b which are as said similar as the connecting element 1 shown in FIGS. 1a-1c. The first connecting element 1a is upside down relative to the second connecting element 1b. As can be seen from FIG. 2a the free portion having a length a is greater than the length b of the connector part 3 between the proximal end 32 and the distal end 31.

FIG. 2b shows a mechanical joint 10 according to the invention in which two similar connecting elements 1 are arranged in contact with each other. The connector part 3 of the first connecting element 1a is provided in the gap 6 of the second connecting element 1b such that the front surface 51 of the contacting portion 5 of the first connecting element 1a is in contact with the front surface 23 of the base part 2 of the second connecting element 1b and such that the back surface 52 of the contacting portion 5 of the first connecting element 1a is in contact with the back surface 52 of the contacting portion 5 of the second connecting element 1b. The end surface 53 of the contacting portion 5 of the first connecting element 1a is arranged in contact with the bottom 61 of the gap 6 of the second connecting element 1b. Further the front surface 51 of the contacting portion 5 of the second connecting element 5 is provided in contact with the front surface 23 of the base part 2 of the first connecting element 5.

Figure 3A:
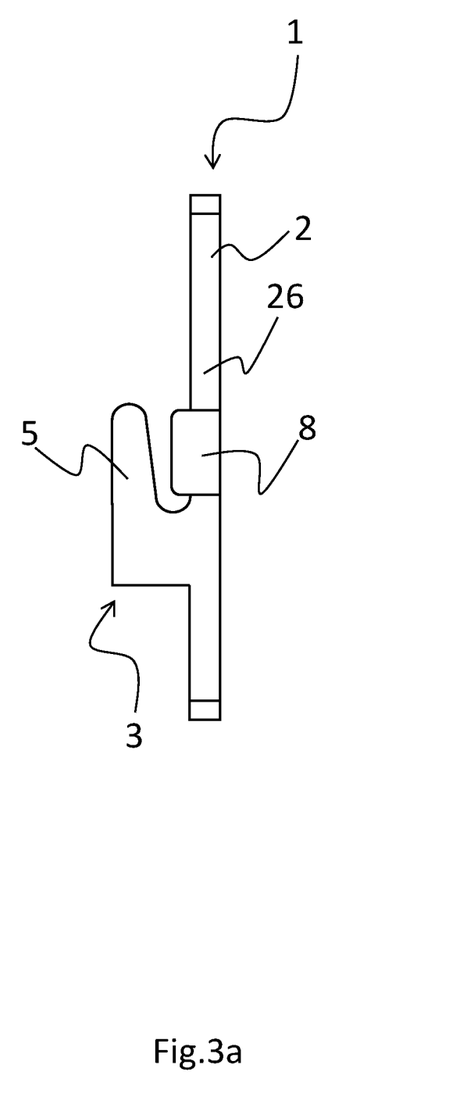
FIG. 3a shows one embodiment of a connecting element according to the invention from one side.
Figure 3B:
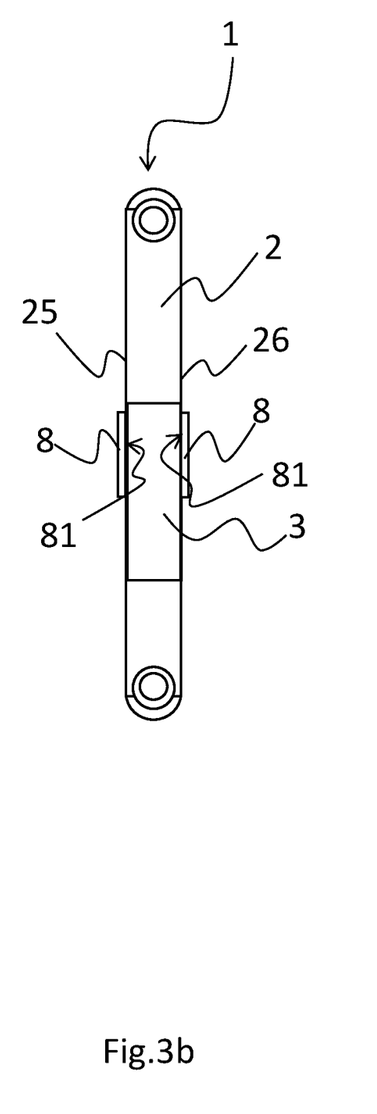
FIG. 3b shows the connecting element shown in FIG. 3a as seen from the front.

FIGS. 3a and 3b show one embodiment of a connecting element according to the invention which the connecting element 1 further comprises a stopping element 8 providing a stopping surface. The stopping surface is arranged to extend transverse to the front surface 23 of the base part 2 and outside of the front surface 23 of the base part 2. In this embodiment of the invention the stopping element 8 is arranged as an integral stopping element 8 to the connecting element 1 such that the integral stopping element 8 is provided to at least one of the first and second side surface 25, 26. FIG. 3b shows that in this embodiment of the invention the stopping element 8 is provided to both first and second side surfaces 25, 26 of the base part 2. The stopping element 8 is provided to the base part 2 such that the stopping surface 81 provided to an inner side of the stopping element 8 faces toward the gap 61 formed between the contacting portion 5 and the front surface 23 of the base part 2 and such that the stopping surface 81 extends from the front surface 23 of the base part 2 toward the contacting portion 5. In other words, the stopping surface 81 at least partly closes the gap 61 from the sides of the base part 2. The stopping surface 81 is arranged to prevent a connecting element forming a mechanical joint with another connecting element from sliding out from the gap 6.

In a preferred embodiment of the invention the base part 2 of the connecting element 1 has a shape that has substantially the same width between the first end 21 and the second end 22 or a shape that has substantially the same width between the first end 21 and the second end 22 except in the first end 21 and in the second end 22 which are rounded. The connector part 3 and especially the contacting portion 5 has preferably the same width as the base part 2. The width of the base part 2 is the dimension extending between the first and second side surfaces 25, 26 of the base part 2.

Figures 4A, 4B:
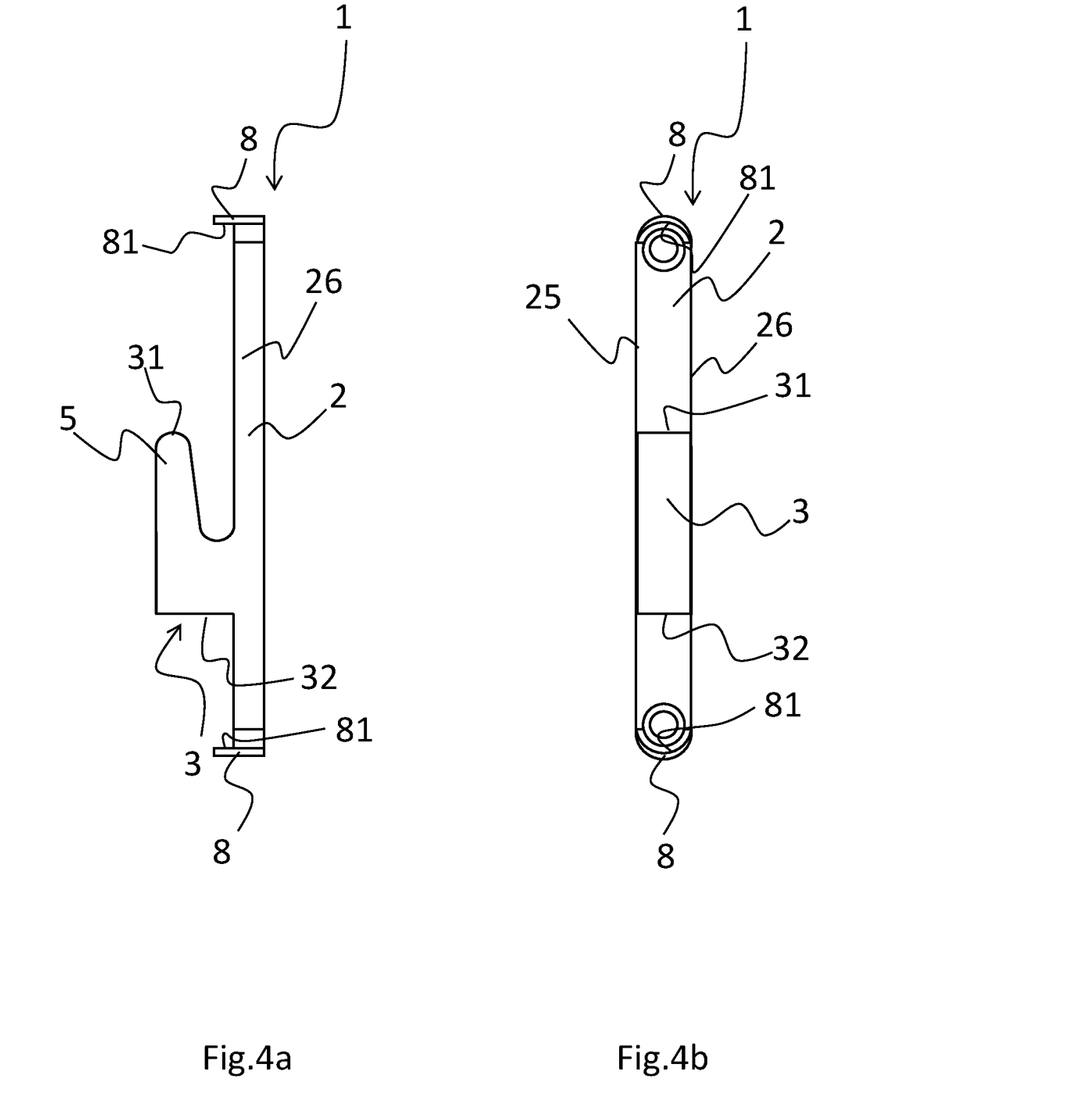
FIG. 4a shows another embodiment of a connecting element according to the invention from one side.
FIG. 4b shows the connecting element shown in FIG. 4a as seen from the front.

FIGS. 4a and 4b show another embodiment of a connecting element according to the invention which the connecting element 1 further comprises a stopping element 8 providing a stopping surface. The stopping surface is arranged to extend transverse to the front surface 23 of the base part 2 and outside of the front surface 23 of the base part 2. In this embodiment of the invention the stopping element 8 is arranged as an integral stopping element 8 to the connecting element 1 such that the integral stopping element 8 is provided to the first end 21 of the base part 2 and/or the second end 22 of the base part 2. FIGS. 4a and 4b show that in this embodiment of the invention the stopping element 8 is provided to both first and second ends 21, 22 of the base part 2. The stopping element 8 is provided to the ends of the base part 2 such that the stopping surface 81 provided to an inner side of the stopping element 8 faces toward the connector part 3, i.e. such that the stopping element 8 provided in the first end 21 of the base part 2 has a stopping surface 81 that faces toward the distal end 31 of the connector part 3 and the stopping element 8 provided in the second end 22 of the base part 2 has a stopping surface 81 that faces toward proximal end 32 of the connector part 3. The stopping surface 81 is arranged to extend away from the front surface 23 of the base part 2 in the same direction as the connector part 3 such that the stopping surface 81 is transverse to the front surface 23 of the base part 2. The stopping surface 81 is arranged outside of the front surface 23 of the base part 2. In other words, the stopping element 8 is arranged to protrude from the end 21, 22 of the base part 2.

Figure 5A:
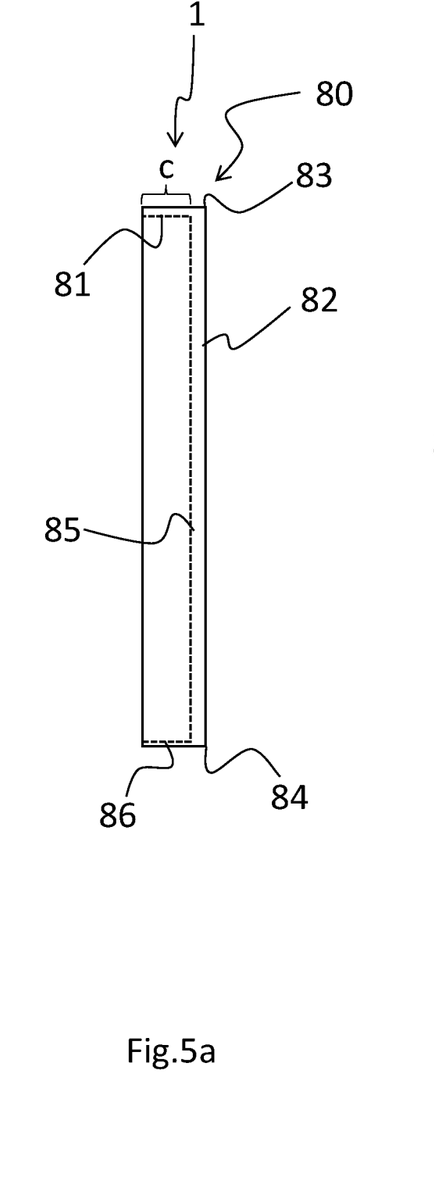
FIG. 5a shows a stopping element according to the invention as seen from one side.
Figure 5B:
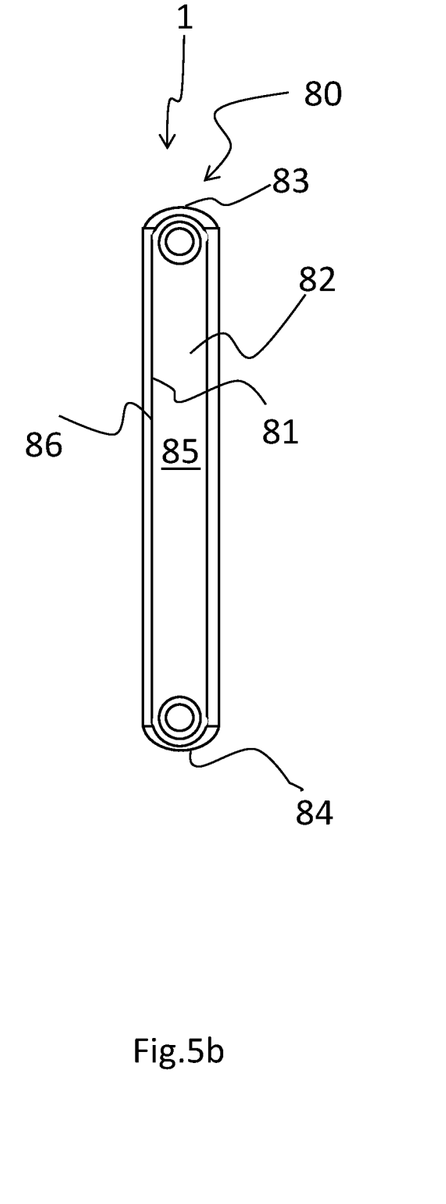
FIG. 5b shows the stopping element shown in FIG. 5a as seen from the front.

FIGS. 5a and 5b a stopping element according to the invention in which the connecting element 1 comprises a stopping element 8, 80 providing a stopping surface, said stopping surface is arranged to extend transverse to the front surface 23 of the base part 2 and outside of the front surface 23 of the base part 2. In this embodiment of the invention the stopping element 80 is provided as a separate stopping element 80. The separate stopping element 80 comprises a base plate 82 having a first end 83 and a second end 84 and a front surface 85 extending between the first end 83 and the second end 84 and at least one side wall 86 protruding from the base plate 82. The at least one side wall 86 extending away from the front surface 85 of the base plate 82 has a height c defined by the distance from the front surface 23 to the top of the side wall 86, the height c is greater than a height d of the base part 2 defined by the distance between the front surface 23 and the back surface 24. The back surface 24 of the base part 2 is to be placed against the front surface 85 of the base plate 82 that the at least one side wall 86 is arranged to provide the stopping surface 81. These are shown in more detail in FIGS. 6a and 6b.

Figure 6A:
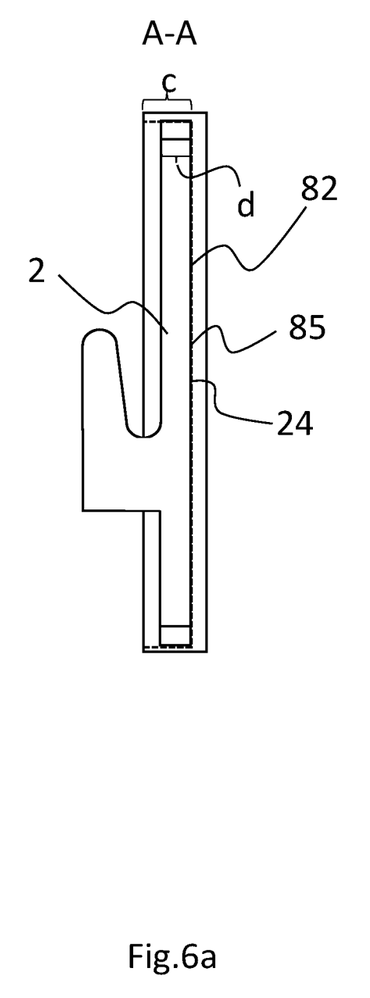
FIG. 6a shows a connecting element and a stopping element as seen from side.
Figure 6B:
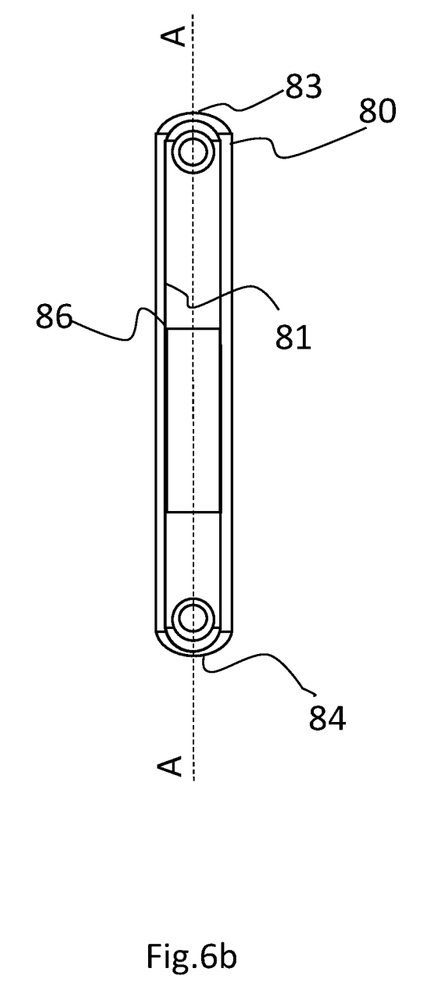
FIG. 6b shows the connecting element and the stopping element shown in FIG. 6a as seen from the front.

FIGS. 6a and 6b shows the connecting element and the separate stopping element 80 in contact with each other. In this embodiment, the connecting element 1 is provided in contact with the separate stopping element 80 such that the back surface 24 of the base part 2 is against the front surface 85 of the base plate 82 of the separate stopping element 80.

In a preferred embodiment of the invention the stopping element 80 has a shape that has substantially the same width between the first end 83 and the second end 84 or a shape that has substantially the same width between the first end 83 and the second end 84 except in the first end 83 and in the second end 84 which are rounded.

In all the FIGS. 3a-6b the stopping element 8, 80 is arranged to prevent the contacting portion 5 of the first connecting element 1a to move in a direction transverse to the direction between the first end 21 and the second end 22 of the base part 2 or the stopping element 8, 80 is arranged to prevent the contacting portion 5 of the second connecting element 1b to move in a direction transverse to the direction between the first end 21 and the second end 22 of the base part 2.

In other words, the first connecting element 1a and/or the second connecting element 1b may further comprise a stopping element 8, 80 providing a stopping surface for preventing movement in the mechanical joint 10 formed of the first connecting element 1a and the second connecting element 1b.

In the mechanical joint 10 the end surface 53 of the contacting portion 5 of the first connecting element 1a is provided against the protrusion portion 4 of the second connecting element 1b forming the bottom 61 of the gap 6.

As can be seen in the figures the connector part 3 preferably has substantially the same width as the base part 2. Alternatively, or in addition the contacting portion 5 has substantially the same width as the base part 2.

Figure 7A:
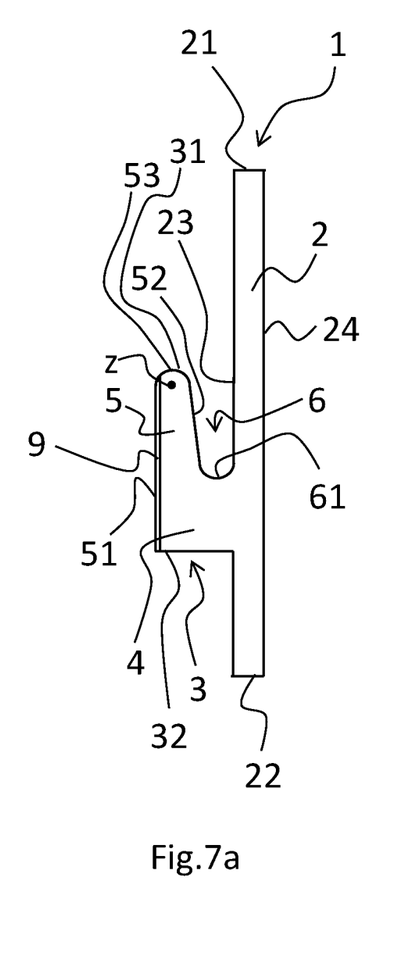
FIG. 7a shows a connecting element according to the invention from one side.
Figure 7B:
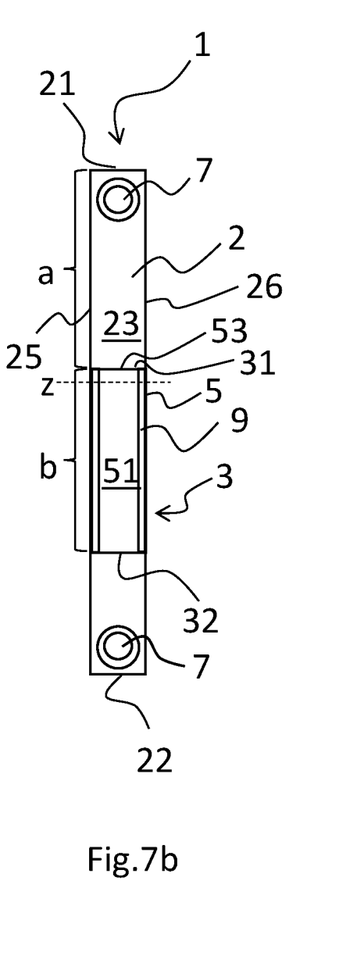
FIG. 7b shows the connecting element shown in FIG. 7a as seen from the front side.

FIGS. 7a and 7b shown one embodiment of the invention in which the contacting portion 5 has at least one bevel 9 extending between the distal end 31 of the connector part 3 and the proximal end 32 of the connector part 3, said at least one bevel 9 is arranged at an edge of the front surface 51 of the contacting portion 5. In FIGS. 7a and 7b there are two bevels 9 on opposite side edges of the front surface 51 of the contacting portion 5.

The mechanical joint 10 can be formed of previously disclosed connecting elements 1a, 1b and the previously explained connecting elements 1a, 1b can be used in a mechanical joint 10 for providing a mechanical connection.

The invention has been described above with reference to the examples shown in the figures. However, the invention is in no way restricted to the above examples but may vary within the scope of the claims.

The invention claimed is:

1. A connecting element for a mechanical joint, the connecting element comprising:
   a base part having a first end and a second end and a front surface extending between the first end and the second end, between the first end and the second end, a back surface extending between the first end and the second end opposite to the front surface, and a first and second side surface extending between the front surface and the back surface,
   the base part being a longitudinal part having a length extending between the first end and the second end and a width extending transversely to a longitudinal direction of the base part, the length of the base part extending between the first end and the second end being greater than the width,
   the base part having a thickness extending between the front surface and the back surface, the thickness being smaller than the length of the base part, and
   a connector part protruding from the base part;
   the connector part having a distal end and a proximal end, the distal end is towards the first end of the base part and the proximal end is towards the second end of the base part,
   the connecting element having a free portion between the distal end of the connector part and the first end of the base part, the free portion having a length (a) which is greater than a length (b) of the connector part between the proximal end and the distal end,
   wherein the connector part comprises:
      a protrusion portion arranged to protrude from the front surface of the base part, and
      a contacting portion extending from the protrusion portion to a direction of the first end of the base part such that a gap is formed between the contacting portion and the front surface of the base part and such that a bottom of the gap is formed by the protrusion portion, the contacting portion having a front surface which is parallel to the portion of the front surface of the base part in the area of the gap and a back surface facing toward the front surface of the base part, a distance between the back surface of the contacting portion and the front surface of the base part is decreasing towards the bottom of the gap, the contacting portion further having an end surface between the front surface and the back surface and extending from the front surface to the back surface, the end surface of the contacting portion forming the distal end of the connector part,
   the connecting element further having a stopping element providing a stopping surface, the stopping surface arranged to extend transverse to the front surface of the base part and outside of the front surface of the base part such that the stopping surface at least partly closes the gap at the sides of the base part.

2. The connecting element according to claim 1, wherein the end surface of the contacting portion having a first form and the bottom of the gap having a second form which is a compatible counter form for the first form.

3. The connecting element according to claim 1, wherein the stopping element is arranged as an integral stopping element to the connecting element such that the integral stopping element is provided to at least one of the first and second side surface; or
   the stopping element is arranged as an integral stopping element to the connecting element such that the integral stopping element is provided to the first end of the base part and/or the second end of the base part.

4. The connecting element according to claim 1, wherein the stopping element is provided as a separate stopping element, the separate stopping element comprising:
   a base plate having a first end and a second end and a front surface extending between the first end and the second end; and
   at least one side wall protruding from the base plate, said at least one side wall extending away from the front surface of the base plate a height (c) which is greater than a height (d) of the base part between the front surface and the back surface;
   the back surface of the base part is to be placed against the front surface of the base plate such that the at least one side wall is arranged to provide the stopping surface.

5. The connecting element according to claim 1, wherein the end surface of the contacting portion is convex having a curvature axis (z) which is parallel to the front surface of the contacting portion and transverse to a direction of the base part between the first end and the second end, and the bottom of the gap having a compatible counter form having the same radius of curvature.

6. The connecting element according to claim 1, wherein the contacting portion having at least one bevel extending between the distal end of the connector part and the proximal end of the connector part, said at least one bevel is arranged at least at an edge of the front surface of the contacting portion.

7. A method of employing a first connecting element and a second connecting element, each of the first connecting element and the second connecting element including the base part, the connector part and the contacting portion according to claim 1, the method comprising providing the first connecting element and the second connecting element in a mechanical joint for accomplishing a mechanical connection.

8. A mechanical joint for connecting two parts mechanically together, the mechanical joint comprises a first connecting element and a second connecting element, each connecting element comprises:
   a base part having a first end and a second end and a front surface extending between the first end and the second end, a back surface extending between the first end and the second end opposite to the front surface, and a first and second side surface extending between the front surface and the back surface,
   the base part being a longitudinal part having a length extending between the first end and the second end and a width extending transversely to a longitudinal direction of the base part, the length of the base part extending between the first end and the second end being greater than the width,
   the base part having a thickness extending between the front surface and the back surface, the thickness being smaller than the length of the base part, and
   a connector part protruding from the base part;
   the connector part having a distal end and a proximal end, the distal end is towards the first end of the base part and the proximal end is towards the second end of the base part,
   the connecting element having a free portion between the distal end of the connector part and the first end of the base part, the free portion having a length (a) which is greater than a length (b) of the connector part between the proximal end and the distal end,
   wherein the connector part comprises:
      a protrusion portion arranged to protrude from the front surface of the base part, and
      a contacting portion extending from the protrusion portion to a direction of the first end of the base part such that a gap is formed between the contacting portion and the front surface of the base part and such that a bottom of the gap is formed by the protrusion portion, the contacting portion having a front surface which is parallel to the portion of the front surface of the base part in the area of the gap and a back surface facing toward the front surface of the base part, a distance between the back surface of the contacting portion and the front surface of the base part is decreasing towards the bottom of the gap, the contacting portion further having an end surface between the front surface and the back surface and extending from the front surface to the back surface, the end surface of the contacting portion forming the distal end of the connector part;
   the contacting portion of the first connecting element is arranged to be placed into the gap of the second connecting element and the contacting portion of the second connecting element is arranged to be placed into the gap of the first connecting element for forming the mechanical joint such that the front surface of the contacting portion of the first connecting element is arranged to be placed against the front surface of the base part of the second connecting element and the back surface of the contacting portion of the first connecting element is arranged to be placed against the back surface of the contacting portion of the second connecting element,
   the mechanical joint further comprising a stopping element for preventing movement of the first connecting element and the second connecting element in the mechanical joint formed of the first connecting element and the second connecting element, the stopping element is arranged to the first connecting element or to the second connecting element or to both the first connecting element and the second connecting element, the stopping element providing a stopping surface arranged to extend transverse to the front surface of the base part and outside of the front surface of the base part such that the stopping surface at least partly closes the gap at the sides of the base part.

9. The mechanical joint according to claim 8, wherein the first connecting element and/or the second connecting element further comprising the stopping element providing the stopping surface.

10. The mechanical joint according to claim 9, wherein the stopping element is arranged to prevent the contacting portion of the first connecting element to move in a direction transverse to the direction between the first end and the second end of the base part; or
   the stopping element is arranged to prevent the contacting portion of the second connecting element to move in a direction transverse to the direction between the first end and the second end of the base part.

11. The mechanical joint according to claim 8, wherein the end surface of the contacting portion of the first connecting element is provided against the protrusion portion of the second connecting element forming the bottom of the gap.

* * * * *